US012774227B2

(12) United States Patent
Calamari et al.

(10) Patent No.: US 12,774,227 B2
(45) Date of Patent: Oct. 27, 2026

(54) MICROFLUIDIC SYSTEMS FOR PULSED ELECTRIC FIELD STERILIZATION

(71) Applicant: President and Fellows of Harvard College, Cambridge, MA (US)

(72) Inventors: Elizabeth Calamari, Cambridge, MA (US); Richard Novak, Cambridge, MA (US); Manuel Ramses Martinez Flores, Cambridge, MA (US); Alexandre L.M. Dinis, Cambridge, MA (US); Robert Cunningham, Cambridge, MA (US); Olivier Henry, Cambridge, MA (US); Donald E. Ingber, Cambridge, MA (US); Jeremy J. Papadopoulos, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 566 days.

(21) Appl. No.: 17/768,734

(22) PCT Filed: Sep. 30, 2020

(86) PCT No.: PCT/US2020/053505

§ 371 (c)(1),
(2) Date: Apr. 13, 2022

(87) PCT Pub. No.: WO2021/076329

PCT Pub. Date: Apr. 22, 2021

(65) Prior Publication Data

US 2024/0140836 A1 May 2, 2024

Related U.S. Application Data

(60) Provisional application No. 62/941,056, filed on Nov. 27, 2019, provisional application No. 62/915,346, filed on Oct. 15, 2019.

(51) Int. Cl.
*C02F 1/48* (2023.01)

(52) U.S. Cl.
CPC .......... *C02F 1/48* (2013.01); *C02F 2301/028* (2013.01); *C02F 2303/04* (2013.01)

(58) Field of Classification Search
CPC ...... C02F 1/48; C02F 1/32; C02F 1/42; C02F 1/34; C02F 1/36; C02F 1/30; C23C 24/00
See application file for complete search history.

(56) References Cited

U.S. PATENT DOCUMENTS 3,923,629 A * 12/1975 Shaffer ............... C02F 1/46109 204/260
2001/0017082 A1 8/2001 Morshuis et al.
(Continued)

FOREIGN PATENT DOCUMENTS

CN 105692803 B * 2/2019 ......... B01D 67/0002
GB 201102076 3/2011
(Continued)

OTHER PUBLICATIONS

CN-105692803-B Translation (Year: 2019).*
(Continued)

*Primary Examiner* — Jonathan M Peo
(74) *Attorney, Agent, or Firm* — Wolf, Greenfield & Sacks, P.C.

(57) ABSTRACT

Microfluidic devices for sterilizing fluids using pulsed electric fields are disclosed. In some embodiments, a device may include first and second electrode layers and a spacer layer positioned between the electrode layers. The spacer layer may define one or more fluid channels extending between the electrode layers. A power supply may be coupled to the electrode layers and configured to supply voltage pulses to the electrode layers to generate electric field pulses within the fluid channels. In some embodiments, the electrode
(Continued)

layers may be textured such that the electric fields generated in the fluid channels are non-uniform.

24 Claims, 14 Drawing Sheets

(56) References Cited

U.S. PATENT DOCUMENTS

| | | | | |
|---|---|---|---|---|
| 2008/0283391 | A1* | 11/2008 | Ogawa | C02F 1/288 204/242 |
| 2015/0173993 | A1 | 6/2015 | Walsh et al. | |
| 2015/0188150 | A1 | 7/2015 | O'Neill et al. | |
| 2016/0107309 | A1 | 4/2016 | Walsh et al. | |
| 2016/0280569 | A1* | 9/2016 | Yeung | C02F 1/46109 |
| 2017/0029300 | A1* | 2/2017 | Yeung | C02F 1/48 |
| 2017/0202724 | A1 | 7/2017 | De Rossi et al. | |
| 2017/0233269 | A1 | 8/2017 | Mohanty et al. | |
| 2018/0008502 | A1 | 1/2018 | Asbeck et al. | |
| 2019/0070062 | A1 | 3/2019 | O'Donnell et al. | |
| 2020/0276698 | A1 | 9/2020 | Ding et al. | |
| 2021/0007874 | A1 | 1/2021 | Galiana Bujanda et al. | |
| 2021/0215554 | A1 | 7/2021 | Araromi et al. | |

FOREIGN PATENT DOCUMENTS

| | | | |
|---|---|---|---|
| GB | 2487796 | A | 8/2012 |
| JP | 2004-066055 | A | 3/2004 |

OTHER PUBLICATIONS

"Machine Translation of JP2004066055A", Kawamitsu, JP2004066055A, published 2004, 14 total pages. (Year: 2004).*

"Machine Translation of KR20200059778A", KR20200059778A, Lee, published 2020, filed Nov. 21, 2018, 29 total pages. (Year: 2020).*

International Search Report and Written Opinion for International Application No. PCT/US2020/053505, mailed Jan. 13, 2021.

Cao et al., Study of high-throughput cell electrofusion in a microelectrode-array chip. Microfluidics and Nanofluidics, Apr. 2008;5:669-75.

Hu et al., A cell electrofusion microfluidic device integrated with 3D thin-film microelectrode arrays; Biomicrofluidics, 2011;5:034121(1-12).

* cited by examiner

MICROFLUIDIC SYSTEMS FOR PULSED ELECTRIC FIELD STERILIZATION

CROSS-REFERENCE TO RELATED APPLICATIONS

This application is a U.S. National Stage Application of PCT/US2020/053505 filed Sep. 30, 2020 which claims the benefit under 35 U.S.C. § 119 (e) of U.S. provisional application Ser. No. 62/941,056 filed Nov. 27, 2019 and U.S. provisional application Ser. No. 62/915,346 filed Oct. 15, 2019, the disclosures of each of which are incorporated herein by reference in their entirety.

FIELD

Disclosed embodiments are related to systems for sterilizing fluids using pulsed electric fields.

BACKGROUND

Numerous approaches for the treatment and sterilization of fluids such as water have been developed, such as chemical treatments (e.g., chlorination), UV treatment, and filtration. Another fluid treatment method, pulsed electric field (PEF) inactivation, uses high strength pulsed electric fields to cause irreversible electroporation of the cell membranes of pathogens, thereby sterilizing the fluid. Commercial PEF systems typically require complex high voltage power sources and a large amount of power to generate the high electric fields needed for sterilization.

SUMMARY

In one embodiment, a fluid treatment device comprises a first textured electrode layer, a second electrode layer and a spacer layer positioned between the first and second electrode layers. The spacer layer is constructed and arranged to define one or more fluid channels extending between the first and second electrode layers from an inlet end at a first edge of the first and second electrode layers to an outlet end at a second opposing edge of the first and second electrode layers. The fluid treatment device further comprises a power supply electrically coupled to the first and second electrode layers. The first and second electrode layers are constructed and arranged to form a non-uniform electric field along a flow length of each of the one or more fluid channels when the power supply supplies a voltage to the first and second electrode layers.

In another embodiment, a fluid treatment device comprises a first electrode layer, a second electrode layer, and a spacer layer positioned between the first and second electrode layers. The spacer layer is constructed and arranged to define one or more fluid channels extending between the first and second electrode layers from an inlet end at a first edge of the first and second electrode layers to an outlet end at a second edge of the first and second electrode layers, and a flow path length of each fluid channel is longer than a distance between the first and second edges of the electrode layers. The fluid treatment device further comprises a power supply electrically coupled to the first and second electrode layers and configured to supply a pulsed voltage to the first and second electrodes to generate pulsed electric fields within the fluid channels.

In a further embodiment, a method for treating a fluid comprises flowing the fluid through one or more fluid channels defined between a first textured electrode layer and a second electrode layer, and applying a non-uniform electric field to the fluid along a flow length of the one or more fluid channels using the first textured electrode layer and the second electrode layer.

In yet another embodiment, a method for treating a fluid comprises flowing the fluid through one or more fluid channels defined between a first electrode layer and a second electrode layer from an inlet end at a first edge of the first and second electrode layers to an outlet end at a second edge of the first and second electrode layers. The method further comprises applying a non-uniform electric field to the fluid along a flow length of the one or more fluid channels using the first electrode layer and the second electrode layer. A flow path length of each fluid channel is longer than a distance between the first and second edges of the electrode layers.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
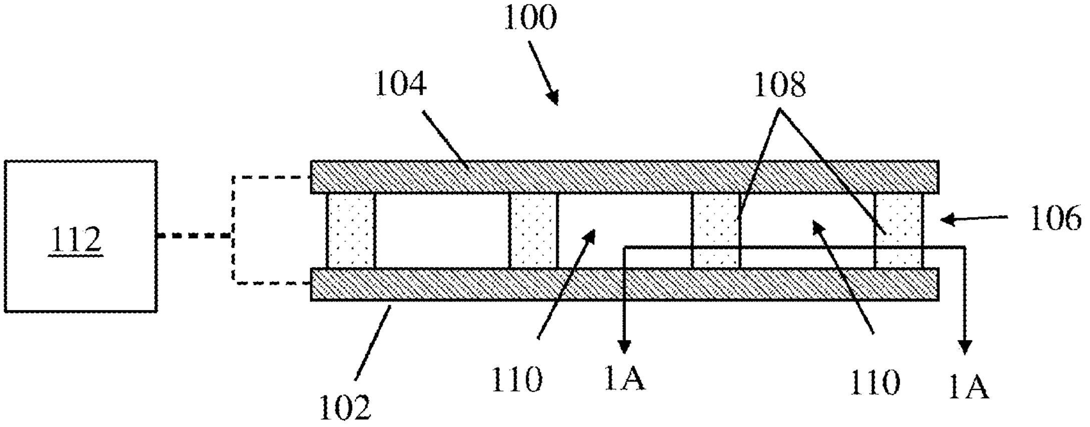
FIG. 1 is a schematic cross-sectional view of a fluid treatment device, according to some embodiments.

The inventors have recognized and appreciated numerous drawbacks associated with existing systems for treating (e.g., sterilizing) fluids. For example, many conventional methods, such as UV treatment are generally only suitable for transparent fluids and/or fluids with a minimal content of organic residue, and thus, are not suitable for use with turbid water or other non-transparent fluids such as milk or juices. Additionally, while pulsed electric field (PEF) systems can be used with turbid water, such systems are generally large and require complex power sources, which make them difficult and expensive to build, maintain, and use. Accordingly, these systems are not well suited for point-of-use and/or low cost treatment applications.

In view of the above, the inventors have appreciated numerous benefits associated with systems and methods utilizing pulsed electric fields in microfluidic devices for treatment of fluids, including turbid water and/or non-transparent fluids. For example, in a microfluidic system, electrodes that deliver the pulsed electric fields to the fluid may be closely spaced, which may allow for the generation of high electric field strengths between the electrodes at much lower input voltages as compared to conventional PEF systems. In this manner, the use of such closely spaced electrodes in the microfluidic fluid treatment devices disclosed herein may allow for low cost, point-of-use fluid treatment with lower power requirements compared to conventional systems. For example, in some embodiments, a fluid treatment device according to the current disclosure may be capable to treating up to 100 liters or more of water using a single standard 9 Volt battery. Moreover, the devices disclosed herein may allow for inactivation of pathogens in clear and/or turbid fluids without the use of filters, which may aid in avoiding clogging. However, instances in which a system has one or more additional treatment capabilities and/or the systems are used with filters are also contemplated.

According to some aspects, the electrodes of a fluid treatment device according to the current disclosure may be constructed and arranged to expose a fluid flowing through a microfluidic channel to a spatially and/or temporally non-uniform electric field. Without wishing to be bound by theory, the inventors have found that non-uniform electric fields may allow for a reduction of the average electric field strength to achieve inactivation of pathogens in a fluid, thereby reducing the input voltage applied to the system, and correspondingly, the power use of the system. As described in more detail below, in some embodiments, such non-uniform electric fields may be generated via three-dimensionally textured electrodes. For example, variations in the spacing between opposing textured electrode layers may lead to variations in the resulting electric field for a given supply voltage between the textured electrodes. Alternatively or additionally, in some instances, textural features of a textured electrode layer such as sharp corners, edges, and/or other geometric transitions may lead to local amplification of an electric field strength, thereby enhancing the non-uniformity of the electric field between the textured electrode layers. Moreover, in some instances, textural features of a textured electrode layer may promote fluidic mixing within the fluid channels.

Additionally, the inventors have recognized and appreciated numerous benefits associated with microfluidic PEF fluid treatment devices in which a flow path of a fluid through a fluid channel is longer than a shortest distance (e.g., a straight distance) between an inlet and an outlet of the fluid channel. For example, the fluid treatment devices disclosed herein may include a serpentine and/or angled fluid flow path that extends between the inlet and the outlet. The inventors have appreciated that such arrangements may allow for the fluid to flow through the fluid channel for a sufficient period of time (e.g., a residence time) to achieve a desired level of pathogen inactivation resulting from a PEF treatment while the fluid flows through the fluid channel. Additionally, as discussed in more detail below, the inventors have appreciated that such arrangements may also promote mixing within the fluid channels, thereby increasing exposure of any pathogens in the fluid to the electric fields. Moreover, the inventors have appreciated that in some instances, fluid channels with non-linear geometries, such as the above noted serpentine fluid path geometry or other appropriate geometry, may aid in avoiding collapse of the fluid channel by ensuring that there are not any unsupported portions of the fluid channel.

In some embodiments, a fluid treatment device may comprise a microfluidic system including one or more microfluidic channels extending between an inlet end and an outlet end. For example, the microfluidic system may be formed as a laminated structure in which opposing surfaces of the microfluidic channels are defined by first and second electrode layers to which a voltage may be supplied from a power source electrically coupled to the electrode layers to generate an electric field in the microfluidic channels between the electrode layers. The electrode layers may be bonded or otherwise attached to one another via a patterned spacer layer constructed and arranged to define walls separating adjacent microfluidic channels. For instance, the spacer layer may be discontinuous in a plane of the spacer layer such that the spacer layer is defined by a plurality of adjacent spacing members extending between the electrode layers to define the walls of the microfluidic channels. In this manner, a thickness of the spacer layer may define a height of the microfluidic channels (which may correspond to a nominal spacing between the electrode layers), and a spacing between adjacent spacing members may define a width of each microfluidic channel. As described in more detail below, the spacing members may be constructed and arranged to define channels having any suitable geometry or pattern, including, but not limited to straight rectangular channels, angled channels, and/or wavy or serpentine channels. Moreover, it should be appreciated that such laminated microfluidic structures may be formed by any suitable manufacturing process, such as a roll-to-roll laminate manufacturing method. Other suitable manufacturing methods may include, but are not limited to, hot melt lamination, extrusion lamination, or adhesive lamination using wet bond, heat, UV cure. In some instances, methods common to microfluidic fabrication may be suitable, such as layer-by-layer assembly, additive manufacturing techniques, thermal fusion bonding, ultrasonic welding, and/or solvent-assisted bonding. Accordingly, it should be understood that the current disclosure is not limited to any particular manufacturing method or technique.

In some instances, such laminate structures may be further assembled into larger scale devices comprising a plurality of microfluidic channels, thereby enabling higher flow rates through a fluid treatment device. For example, in some embodiments, multiple laminate structures may be stacked to form an array of fluid channels (e.g., a rectangular array). In other embodiments, a laminate structure may be rolled into a cylindrical layered structure (which may be referred to as a jelly roll-type structure) or a cylindrical shell geometry. However, it should be appreciated that other arrangements of laminate and/or layered structures may be suitable as the current disclosure is not limited in this regard.

According to some aspects, the electrode layers included in the microfluidic fluid treatment devices disclosed herein may be flexible. For example, in some embodiments, an electrode layer may be formed by coating a conductive layer, such as a conductive metallic layer (e.g., gold, platinum, titanium, stainless steel, etc.) onto a flexible support film, such as a polymeric support film. Suitable materials for such a support film include, but are not limited to, thermoplastic polymers such as polyethylene terephthalate, polycarbonate. In other embodiments, the electrode layers may be formed from conductive materials, such as conductive polymers (e.g., Nafion, or PEDOT:PSS), non-conductive polymers doped with conductive materials (such as metal or carbon particles), thin metal foils (e.g., aluminum or stainless steel foils), and/or a combination of the these electrode structures. Moreover, in some embodiments, the electrode layers may be coated with a conductive but chemically inert coating, such as a graphite-epoxy coating, which may aid in increasing the operational lifespan of the fluid channels, as well as reducing the power consumption of the devices disclosed herein. For example, such coatings may aid in distributing power across the electrode layers and may reduce the likelihood of brown-outs and parasitic capacitance between the closely spaced electrodes during short, high voltage pulses. Alternatively or additionally, in some embodiments, the electrode layers may be coated in a corrosion resistant material, materials configured to modulate the electrochemical properties of the electrode layers, and/or materials selected to provide a non-fouling and/or low-friction surface within the fluid channels (e.g., a Teflon or silanized coating material).

In some embodiments, the spacer layer may be formed from a non-conductive material such that the spacer layer does not conduct current between the first and second electrode layers. In this manner, when a power supply supplies a voltage to the first and second electrode layers, the spacer layer does not provide a conduction path, and instead maintains a physical and electrical separation between the electrode layers such that a voltage across the electrode layers generates an electric field in the fluid channels extending between the electrode layers. In some embodiments, the spacer layer may comprise an insulating polymer material such as PET, though any other insulating, food-contact safe material may be used, such as polycarbonate, poly propylene, LDPE or HDPE, ABS, polyetherimide, polyimide, polysulfone, acrylates, fluorinated thermoplastics, silicone and other rubber, thermoset polymers such as thermally, UV, or chemically curable polymers, glass, silicon, natural materials such as rubber or silk or resins. Suitable materials for the spacer layer may include combinations of the above-noted materials and/or composite structures. Further, in some instances, the spacer layer may include one or more adhesive layers disposed on a face of the spacer layer oriented towards an adjacent electrode to facilitate bonding to the first and second electrode layers. Though, embodiments in which bonding methods other than adhesives are used, such as ultrasonic welding, through-hole tacking, and/or any other appropriate method for bonding the layers together are also contemplated, as the disclosure is not limited in this fashion.

As noted above, in some embodiments, the electrode layers of a microfluidic fluid treatment device may be three-dimensionally textured. For example, each of the electrode layers may have a textured surface on a side of the electrode layer facing into the microfluidic channels. Depending on the particular embodiment, the three-dimensionally textured surfaces may include patterns such as saw-tooth patterns, square wave patterns, arrays of indentations (e.g., round or angled dimples), and/or arrays of protrusions (e.g., hemispherical, rectangular, cylindrical, conical, pyramidal or other shaped protrusions). Such textured electrodes may result in a variable spacing between the conductive electrode surfaces, which may provide for spatial variation of the electric field between the electrode layers when a voltage is supplied to the electrodes. Moreover, in some instances, topographical features such as edges and/or sharp corners may lead to localized concentration of the electric field. In this manner, when a fluid flows through a fluid channel extending between two textured electrode layers, the fluid may be exposed to spatial and temporal variations in the electric field strength, in addition to variations in the electric field resulting from voltage pulses in a PEF treatment. The inventors have found that by exposing pathogens in a fluid to such variable electric field strengths, inactivation of pathogens in the fluid can be achieved at lower input voltages as compared to conventional PEF systems, and thus allow for lower overall power consumption.

It should be appreciated that the current disclosure is not limited to any particular arrangement for generating a fluid flow through the one or more microfluidic channels of the devices disclosed herein. For example, in some embodiments, the flow may be passively generated (e.g., via a gravity feed). In some embodiments, flow may be actively driven, such as by pumping fluid through the channels. Moreover, it should be understood that the current disclosure is not limited to any particular flow pattern through the microfluidic channels. For example, the flow may be continuous, pulsed at varying flow rates, and/or intermittently stopped.

Depending on the particular embodiment, the topographical features defining the textured surfaces of the electrodes may have any suitable dimensions. For example, in some embodiments, a height of the topographical features may be between about 20 microns and about 200 microns. Moreover, it should be appreciated that such topographical features may be formed in any suitable manner, including, but not limited to, embossing methods (e.g., hot embossing or roll-to-roll embossing), casting methods, subtractive manufacturing methods (e.g., machining, engraving, laser etching) additive manufacturing methods, and/or layer-by layer manufacturing methods.

The textured surfaces of the textured electrode layers may be oriented in any suitable manner. For example, in some embodiments, a texture of a first textured electrode may be misaligned with a texture of a second electrode layer. Without wishing to be bound by theory, such misalignment may aid in enhancing the non-uniformity of the electric field between the first and second electrode layers, and also may aid in reducing variability between laminated structures. For example, in one embodiment, electrodes having a saw-tooth texture may be misaligned by about 45 degrees, which may result in the structure exhibiting all possible misalignments (and thus all possible electric field inhomogeneity) in a small area. In other embodiments, textured surfaces of the first and second electrodes may be configured to have different phases to aid in ensuring that the textures are always misaligned with one another. For example, in one embodiment, first and second electrode layers may have saw-tooth textures having different pitches and may be angled with respect to one another. The inventors have appreciated that such arrangements may aid in ensuring that the fluid flowing between the textured layers is exposed to the full range of electric field strengths generated between the electrode layers, thereby further promoting enhanced pathogen inactivation.

In addition to the above, the inventors have recognized and appreciated that the three-dimensionally textured electrode structures described herein may provide numerous benefits in connection with the flow of fluid through the fluid channels extending between the electrode layers. For example, textured patterns such as saw-tooth patterns that are misaligned relative to a flow direction of the fluid in the fluid channels may aid in promoting fluidic mixing within the fluid channel. Alternatively or additionally, such arrangements may aid in removing bubbles and/or debris from the flow path and/or guiding bubbles towards the edges of fluid channels, which may aid in enhancing the exposure of the fluid to the non-uniform electric field and promote inactivation of pathogens.

Depending on the particular embodiment, the dimensions of the fluid channels extending between the electrode layers may be selected to provide a desired maximum electric field strength within the fluid channels, as well as a desired flow rate through the fluid channels. In some embodiments, a height of the fluid channels (i.e., a distance between the electrode layers) may be between about 10 microns and about 2 mm. For example, the fluid channel height may be greater than 10 microns, greater than 50 microns, greater than 100 microns, greater than 200 microns, greater than 500 microns, and/or greater than 1 mm. In other embodiments, the channel height may be less than 2 mm, less than 1 mm, less than 500 microns, less than 200 microns, less than 100 microns, less than 50 microns, and/or less than 20 microns. Combinations of the above-noted ranges also may be suitable. In one exemplary embodiment, the channel height may be about 100 microns. In embodiments including three-dimensionally textured electrode layers, the above-noted channel heights may correspond to a minimum spacing between the topographical features defining the textured surface of each electrode layer.

In some embodiments, a width of each microfluidic layer (i.e., a spacing between adjacent spacing members of a spacer layer) may be between about 100 microns and about 5 cm. For example, a width of each fluid channel may be greater than 100 microns, greater than 500 microns, greater than 1 cm, greater than 2 cm, greater than 3 cm, greater than 4 cm, or greater than 5 cm. In other embodiments, the width of each fluid channel may be less than 5 cm, less than 4 cm, less than 3 cm, less than 2 cm, less than 1 cm, less than 500 microns, or less than 200 microns. Combinations of the above-noted ranges also may be suitable.

It should be appreciated that the fluid channels may be configured to define any suitable flow path between an inlet end of the fluid channels and an outlet end of the fluid channels. For example, the inlet end of a fluid channel extending between first and second electrode layers may by a first of edge of the first and second electrode layers, and the outlet end may be defined by a second edge of the electrode layers opposite the first edge. In some embodiments, the flow path length of each fluid channel may be longer than a distance between the first and second edges of the electrode layers. For example, the fluid channels may be arranged in a serpentine or wavy pattern (e.g., a sinusoidal pattern), an angled linear pattern relative to the edges of the electrode layers the inlets and outlets are formed on, and/or any other appropriate geometry. In this manner, the flow path length may be adjusted to provide a desired residence time within the fluid channels for a given flow rate, such that the fluid is exposed to the PEF treatment for a sufficient time to achieve inactivation of pathogens contained in the fluid. For example, in some embodiments, the flow path length may be configured to provide a residence time of five seconds or more for a given flow rate and fluid channel geometry. Additionally, in some instances, such a wavy flow path configuration may aid in avoiding collapse of the fluid channels, as described in more detail below. Furthermore, in some embodiments including textured electrode layers, the above-described flow path geometries may aid in defining a flow direction that is misaligned with the electrode textures, which may aid in fluidic mixing and bubble removal as discussed previously.

A fluid treatment device according to the current disclosure may include any suitable number of fluid channels to provide a desired total flow rate. For example, in some embodiments, a fluid treatment device may include between about 50 and 1000 fluid channels, and a total flow rate through the device may be up to about 0.2 liters per minute or more.

According to some aspects, the electrode layers of a fluid treatment device may be electrically coupled to a power supply configured to supply a pulsed voltage to the first and second electrodes, and thus, generate pulsed electric fields within the fluid channels. For example, in some embodiments, the voltage may be pulsed in a square wave between about 0 and 120 volts. In some embodiments, a bidirectional voltage pulse may be used, such as between −120 volts and 120 volts. Depending on the particular fluid channel configuration (e.g., the channel height and/or particular textured electrode topography), the resulting electric field during a voltage pulse may be up to tens of thousands of volts per cm. However, it should be understood that any appropriate type of electrical waveform, voltage magnitude, frequency, and/or duration of application may be used to provide the desired PEF treatment as the disclosure is not limited to only the ranges noted above.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic cross-sectional view of a portion of one embodiment of a fluid treatment device 100. The device includes first and second electrode layers 102 and 104 bonded to one another via a spacer layer 106 comprising a plurality of spacing members 108. As illustrated, the spacing layer defines a plurality of fluid channels 110 extending between the electrode layers 102 and 104. Additionally, the electrode layers are electronically coupled to a power supply configured to deliver voltage pulses to the first and second electrode layers to generate pulsed electric fields within the fluid channels 110.

Figure 1A:
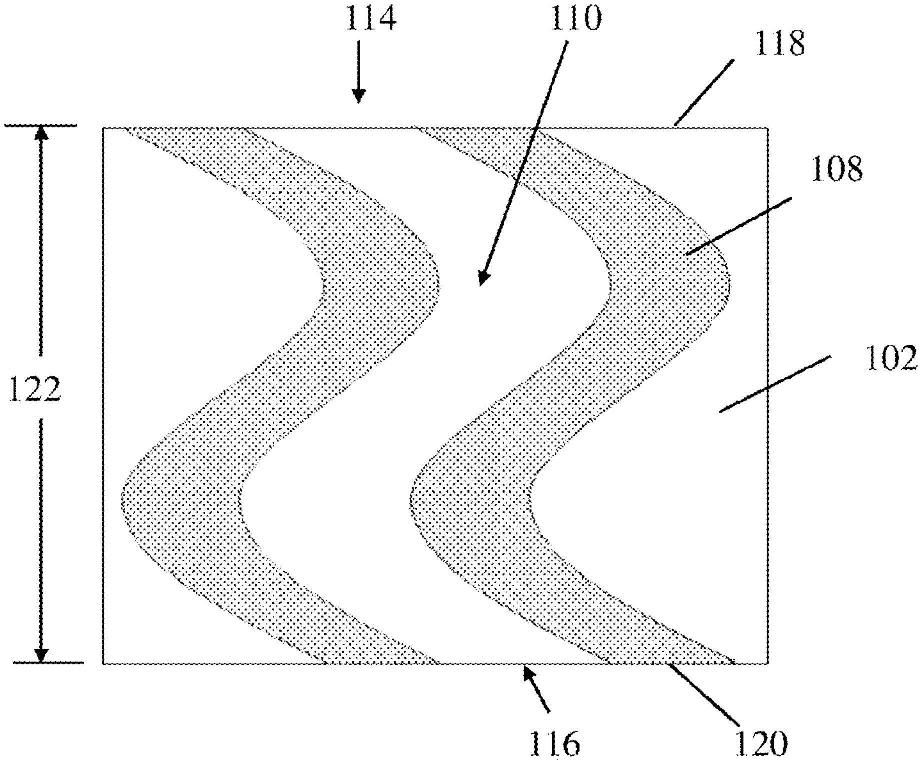
FIG. 1A depicts the fluid treatment device of FIG. 1 viewed along line 1A-1A.

FIG. 1A depicts a view of the device 100 taken along line 1A-1A shown in FIG. 1. As illustrated, the spacing members 108 of the spacer layer 106 may be configured to define a flow path for the fluid channels 110 between an inlet end 114 and an outlet end 116. For example, the inlet end 114 may be defined by a first edge 118 of the first electrode layer 102, and the outlet end 116 may be defined by a second edge 120 of the first electrode layer that is opposite the first edge 118. Though not depicted in FIG. 1A, the inlet end 114 and outlet end 118 may similarly be defined by opposing first and second edges of the second electrode layer 104. As used herein, opposing edges of the electrode layers refer to opposing boundaries of the electrode layer where the electrode layers terminate. In the depicted embodiment, the spacing members 108 of the spacer layer define a serpentine flow path for each fluid channel such that a flow path length of the fluid channel between the inlet end 114 and the outlet end 118 is less than a distance 122 between the first edge 118 and second edge 120 of the first electrode layer 120. While a serpentine arrangement is depicted, it should be appreciated that other arrangements may be suitable to provide a flow length longer than the distance 122 between the first and second edges 118, 120 of the first electrode layer. For example, spacing members 108 may be arranged to define a linear flow path that is angled relative to the distance 122. Alternatively, the fluid channels may be straight in some embodiments such that the flow path length of the fluid channel 110 is substantially the same as the distance 122 between the first and second edges 118 and 120 of the electrode layer 102.

Figure 2:
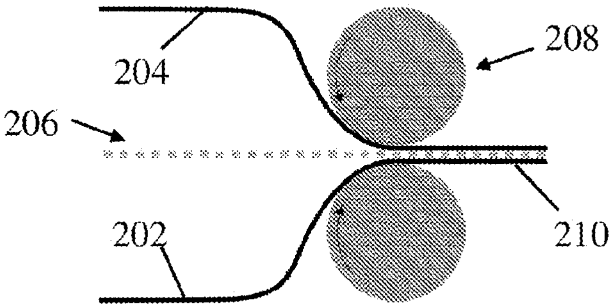
FIG. 2 is a schematic representation of a method for assembling a fluid treatment device, according to some embodiments.

Referring now to FIGS. 2-5, various methods of assembling fluid treatment devices are discussed in more detail. In particular, FIG. 2 depicts one embodiment of a roll-to-roll manufacturing process that may be used to form a laminate microfluidic structure 210. In particular, first and second electrode layers 202 and 204 may be fed into a roller 208 with a patterned spacer layer 206 separating the electrode layers. In some instances, the spacer layer 206 may include an adhesive disposed on opposing sides of the spacer layer oriented towards the corresponding adjacent electrode layer to aid in bonding the electrode layers together to form the laminate microfluidic structure 210. As discussed above, the patterned spacer layer may comprise a plurality of spacing members to define fluid channels extending between the first and second electrode layers.

While a roll-to-roll assembly process is described above, it should be understood that any appropriate method of assembly the layers together may be used as the disclosure is not limited in this fashion. Further, while adhesives may be used to bond the layers together in some embodiments, instances in which ultrasonic welding and/or any other appropriate methods are used for bonding the layers together are also contemplated as the disclosure is not limited in this fashion.

Figure 3:
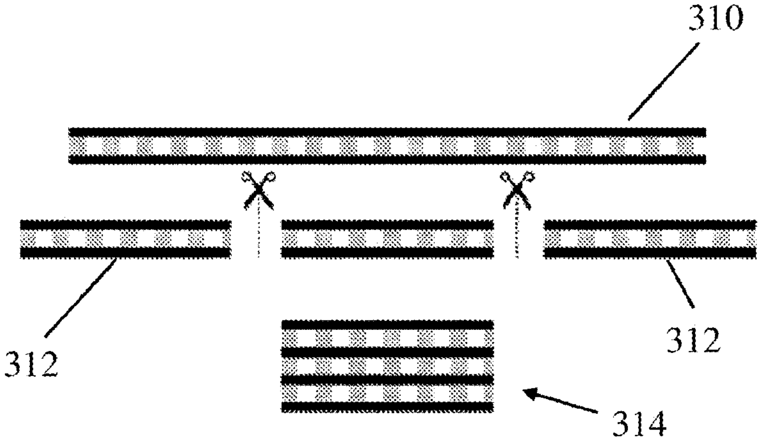
FIG. 3 is a schematic representation of a method for forming a stacked laminate microfluidic structure, according to some embodiments.
Figure 4:
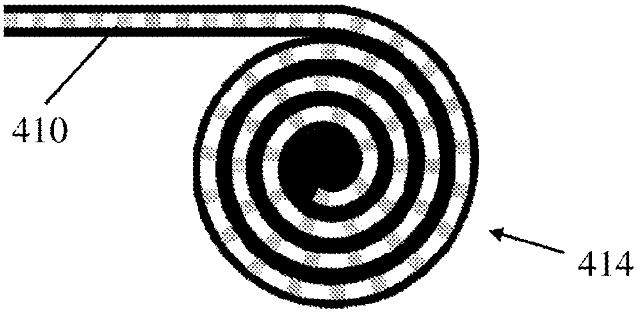
FIG. 4 is a schematic representation of a a method for forming a rolled laminate microfluidic structure, according to some embodiments.
Figure 5:
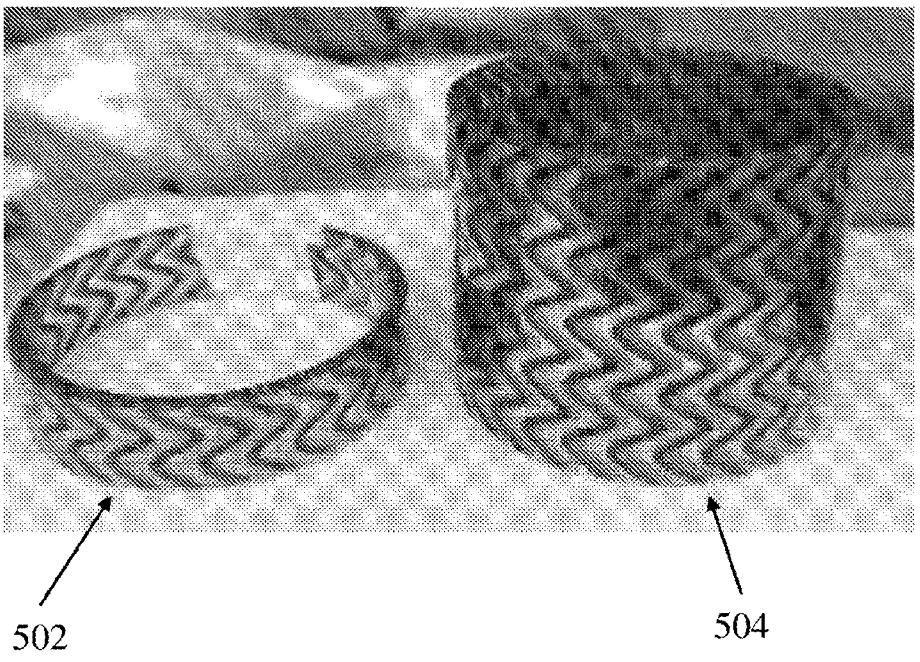
FIG. 5 is a photograph showing two cylindrical laminate microfluidic structures, according to some embodiments.

As illustrated in FIG. 3, in some embodiments, a laminate microfluidic structure 310 may be cut into segments 312, which may subsequently be assembled by stacking individual segments on top of each other to form a macroscopic structure such as a rectangular array 314 of the stacked segments. FIG. 4 depicts another embodiment in which a laminate microfluidic structure 410 is rolled into a jellyroll structure 416. FIG. 5 shows an embodiment of further arrangements in which a laminate microfluidic structure is formed into cylindrical structures 502 and 504. As illustrated, these cylindrical structures have different lengths (which correspond to a distance between opposing edges of the electrode layers, as discussed above in connection with FIG. 1A). Furthermore, each of the cylindrical structures comprises serpentine fluid channels such that a length of the fluid flow path through the fluid channels is greater than the lengths between the opposing sides of the cylindrical structures 502 and 504 in which the inlets and outlets of the microfluidic channels are formed. Once assembled into a desired geometry or structure (e.g., rectangular array 314, jellyroll structure 414, cylindrical structure 502 or 504, or any other suitable structure), the electrode layers may be coupled to a power supply, as discussed above. Moreover, as described in more detail below, in some instances, these structures may be received in in a cartridge assembly that may facilitate inflow and outflow of fluid into the fluid channels.

Figure 6:
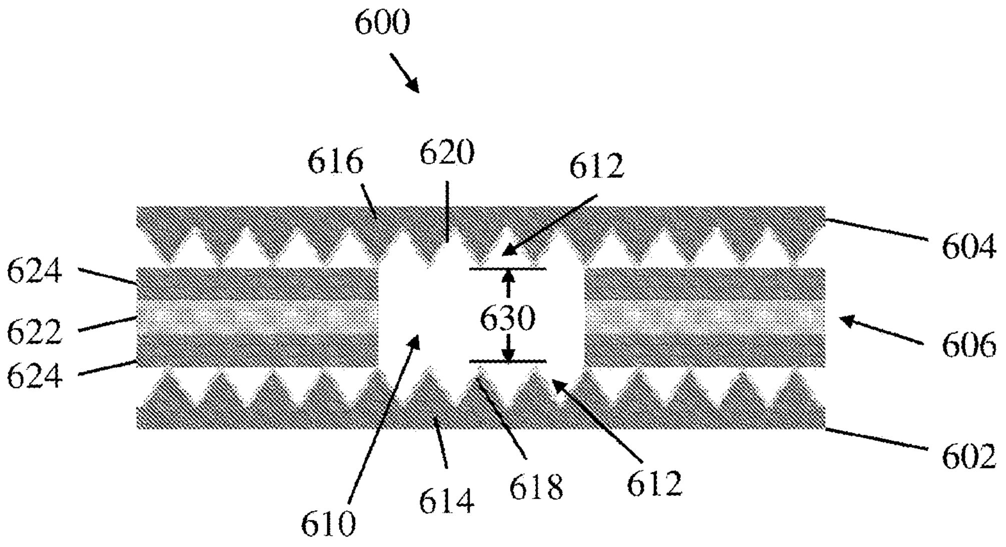
FIG. 6 is a schematic cross-sectional view of a portion of a fluid treatment device including textured electrodes, according to some embodiments.

Referring now to FIG. 6, another embodiment of a microfluidic fluid treatment device is described in more detail. In particular, FIG. 6 depicts a cross-sectional view of a portion of a laminate microfluidic structure 600. Similar to the embodiments described previously, the depicted embodiment includes first and second electrode layers 602 and 604 bonded to one another via a spacer layer 606, which is constructed and arranged to define fluid channels 610 extending between the electrode layers. In this embodiment, the first and second electrode layers 602 and 604 each feature a three-dimensionally textured surface; in particular, each electrode includes a saw-tooth texture 612. As discussed above, such a textured surface configuration may result in a spatially non-uniform electric field between the electrodes when a voltage is supplied to the electrodes by a corresponding power supply (not depicted). As illustrated in FIG. 6, a fluid channel height 630 is defined herein as a minimum spacing between the textured structure 612 of the opposing electrodes 602 and 604.

While the embodiment depicted in FIG. 6 includes two textured electrodes having substantially the same texture pattern, it should be appreciated that the current disclosure is not so limited. For example, in some embodiments, only one of the electrodes may be textured. Further, in some embodiments, the two electrode layers may have different texture patterns and/or texture patterns having different dimensions for the textural features.

Depending on the particular embodiment, the textured surface of the electrodes may be formed in any suitable manner. For example, in the depicted embodiment, the electrodes 602 and 604 include a textured polymer layer 614 and 616, respectively (which may be patterned using any suitable method such as embossing, casting, additive manufacturing, layer-by-layer processing) that are each coated with a thin conductive layer 618, 620, such as a metallic layer (e.g., gold, platinum, titanium, stainless steel, etc.) or a layer of any other suitable conductive material.

Additionally, as shown in FIG. 6, the spacer layer 606 may include one or more separate layers, such as a polymeric support layer 622 (e.g., a PET support layer) and adhesive layers 624 to facilitate bonding of the spacer layer 606 to the first and second electrode layers.

Figure 7:
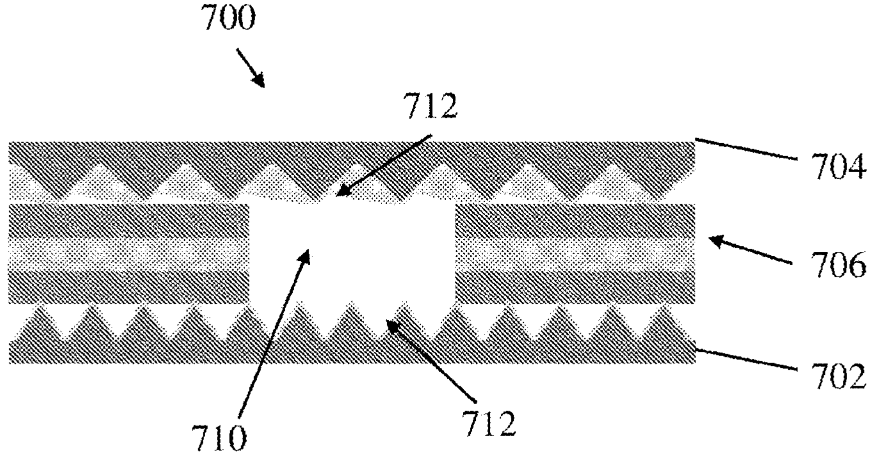
FIG. 7 is a schematic cross-sectional view of a portion of a fluid treatment device including misaligned textured electrodes, according to some embodiments.

As discussed above, embodiments including textured electrode layers may include electrodes oriented in any suitable manner with respect to one another. For example, the embodiment shown in FIG. 6 illustrates electrode layers 602 and 604 in which the textured surfaces are substantially aligned. In contrast, FIG. 7 depicts an embodiment in which the textures of the first and second electrode layers 702 and 704 are misaligned with one another. In particular, similar to FIG. 6, FIG. 7 depicts a cross-sectional view of a portion of a laminate microfluidic structure 700 including first and second electrode layers 702 and 704 bonded to one another via a spacer layer 706, which is constructed and arranged to define fluid channels 710 extending between the electrode layers. Each of the electrode layers includes a saw-tooth textured pattern 712, but the texture of the second electrode layer 704 is misaligned relative to the texture of the first electrode layer. For example, in the depicted embodiment, the saw-tooth patterns 712 are misaligned by about 45 degrees, though it should be understood that other misalignment angles, offset spacings, and/or different phase relationships for the textured patterns of each electrode layer may be suitable, as the current disclosure is not limited to any particular type or amount of misalignment.

Figure 8:
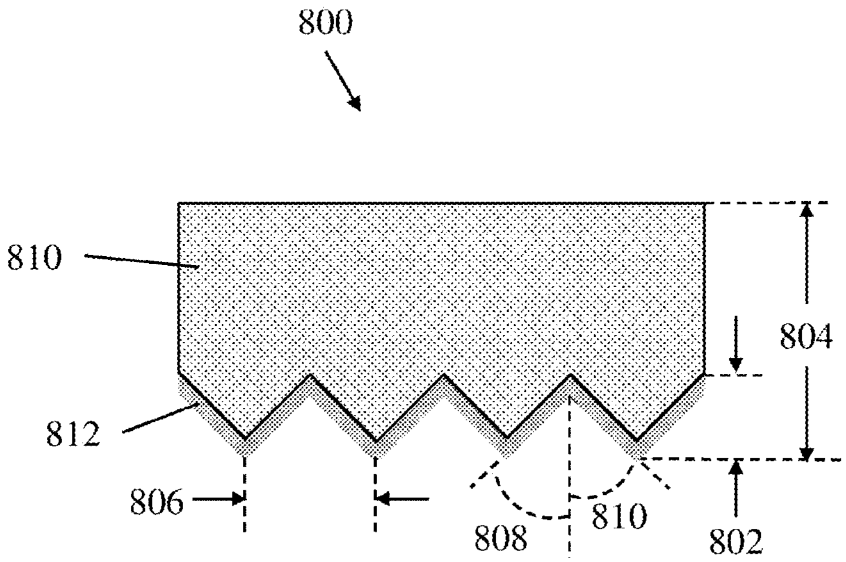
FIG. 8 is a schematic cross-sectional view of a portion of a textured electrode layer, according to some embodiments.

FIG. 8 depicts a cross-sectional view of a portion of a textured electrode layer 800 including a base layer 810 and a conductive coating layer 812, according to some embodiments. As illustrated, the textured electrode layer may be characterized by various dimensions. For example, a characteristic texture height 802 may be between about 20 microns and about 200 microns or more. In some embodiments, an overall thickness 804 of the electrode layer may be between about 0.1 mm and about 2 mm (e.g., about 0.5 mm), and a spacing 806 between adjacent texture features (e.g., between peaks of a saw-tooth pattern) may be between about 30 microns and bout 400 microns. Moreover, a saw-tooth pattern may be characterized by first and second angles 808 and 810. For example, in the depicted embodiment, each of these angles is approximately 45 degrees such that the saw tooth pattern is symmetrical, though other arrangements, such as asymmetric saw-tooth (or other non-saw-tooth patterns as discussed previously) may be suitable, as the current disclosure is not limited in this regard.

Figure 9:
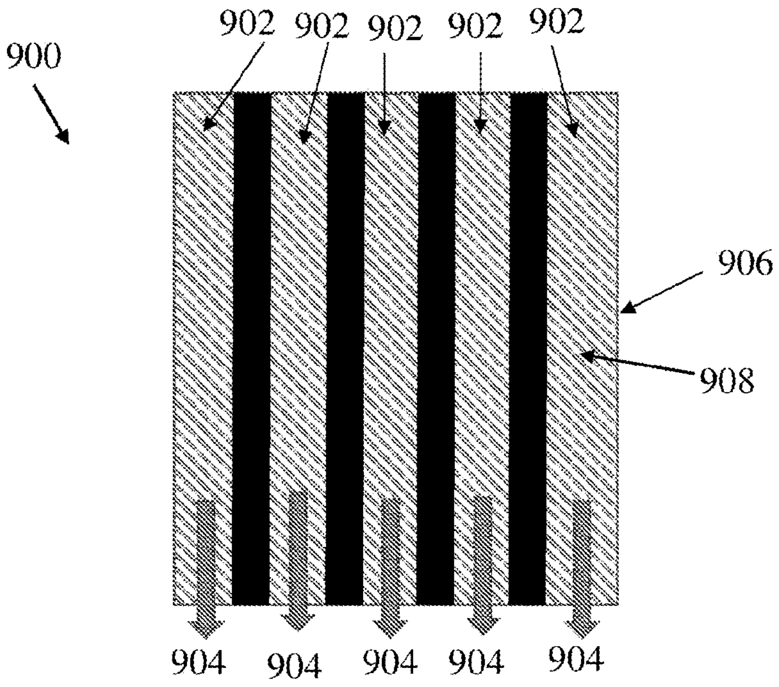
FIG. 9 is a schematic representation of a portion of a microfluidic fluid treatment device, according to some embodiments.

In some embodiments including one or more textured electrode layers, a flow direction of a fluid within a fluid channel may be misaligned relative to the texture of the electrode layers. For example, FIG. 9 depicts a schematic representation of one embodiment of a microfluidic fluid treatment device 900 including a plurality of fluid channels 902 in which fluid flows along flow directions 904. A textured electrode layer 906 includes texture features 908 that extend along a direction that is misaligned with the flow directions 904. For example, the texture features 908 may include saw-tooth features, features with square or rectangular, or rounded cross sections, and/or any other texture features that extend along a direction of extension. As discussed above, the inventors have appreciated that such misalignment of the flow direction and the electrode texture may aid in promoting fluidic mixing within the fluid channels 902, which may aid in ensuring that pathogens in the fluid are exposed to the non-uniform electric fields and inactivated. Moreover, as noted above, in some instances, such misalignment between the flow direction 904 and the textured features 908 may facilitate removal of bubbles from the fluid.

Figure 10A:
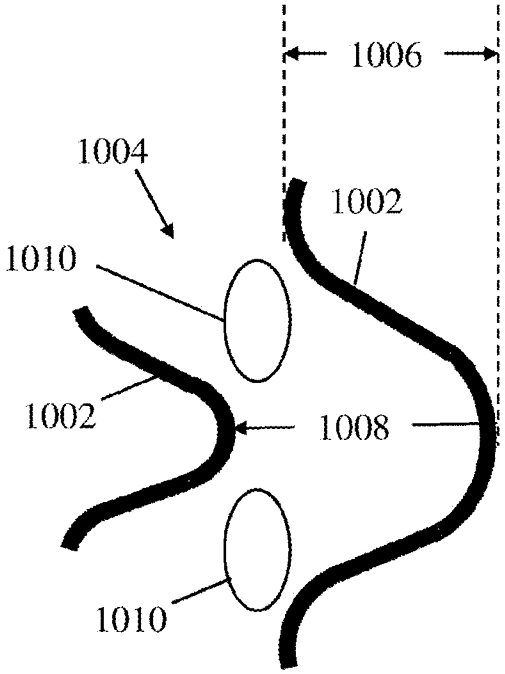
FIG. 10A is a schematic representation of a portion of a serpentine fluid path, according to some embodiments.
Figure 10B:
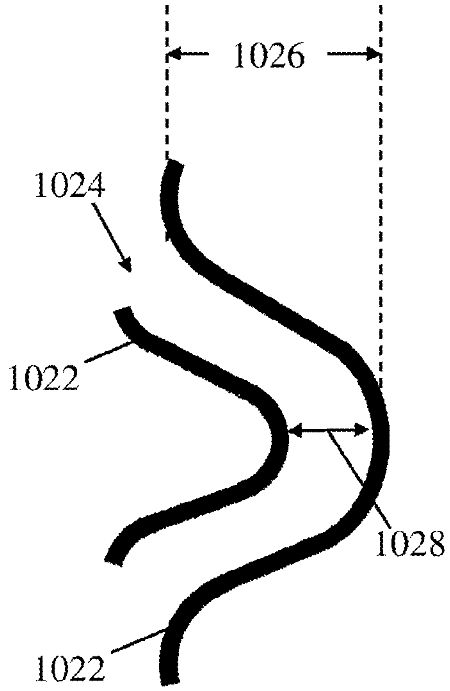
FIG. 10B is a schematic representation of a portion of a serpentine fluid path, according to some embodiments.

Referring now to FIGS. 10A and 10B, some aspects of embodiments of microfluidic fluid treatment devices including serpentine fluid paths or other non-linear paths are described in more detail. In some embodiments a serpentine fluid may have dimensions selected to aid in avoiding collapse of a fluid channel, which may occur if the electrode layers bounding the fluid channel are not adequately supported and come into contact, thereby at least partially blocking flow through the fluid channel. For example, FIG. 10A depicts an arrangement in which spacing members 1002 of a spacer layer are arranged to define a serpentine fluid channel (e.g., a following a sinusoidal flow path). However, in the depicted arrangement, an amplitude 1006 of the serpentine pattern is smaller than a width 1008 of the fluid channel 1004. As a result, the fluid channel includes regions 1010 in which the electrode layers bounding the fluid channel are not supported and may be prone to collapse. In contrast, in the embodiment shown in FIG. 10B, spacing members 1022 are arranged to define a serpentine fluid channel 1024, or other non-linear fluid channel, in which an amplitude 1026 of the pattern in a direction parallel to the opposing electrode layers is greater than a width 1028 of the fluid channel 1024 in the same direction. In this manner, the fluid channel 1024 does not include any portions in which the electrode layers bounding the fluid channel are unsupported, and thus the channel may be more robust and less likely to collapse during processing or use.

Figure 11:
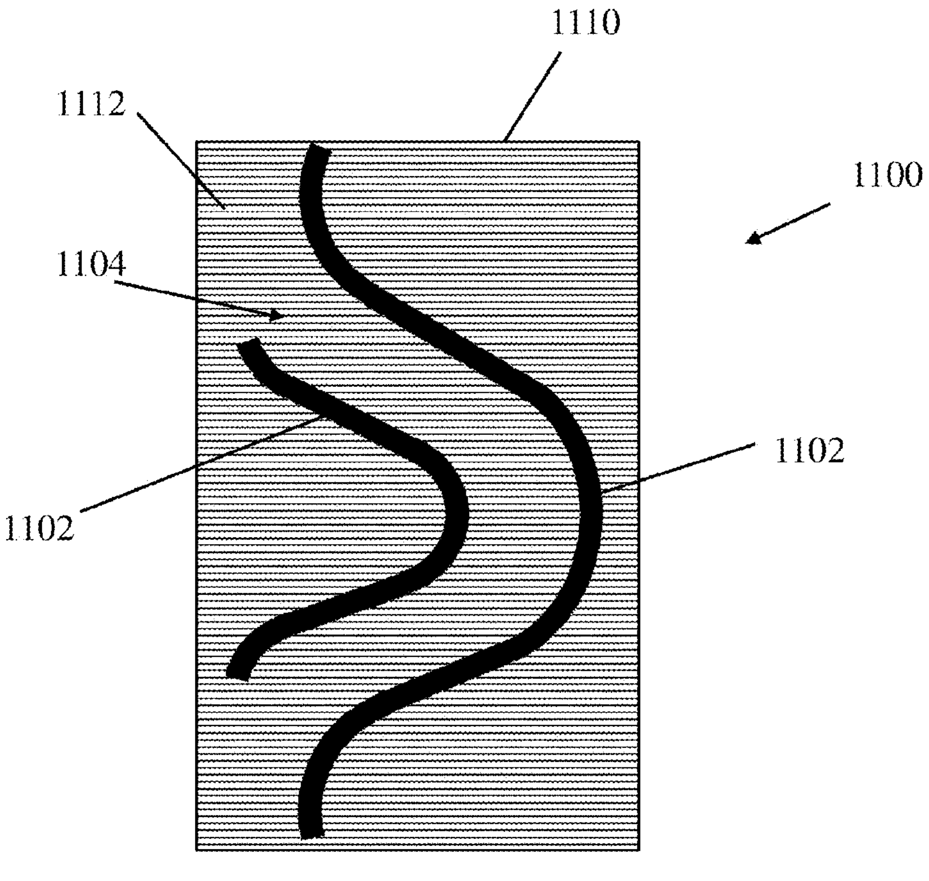
FIG. 11 is a schematic representation of a portion of a microfluidic fluid treatment device, according to some embodiments.

FIG. 11 depicts another embodiment of a portion of a microfluidic fluid treatment system. Similar to the embodiment discussed above in connection with FIG. 10B, the depicted embodiment includes spacing members 1102 configured to define a serpentine flow path 1104, or other non-linear channel. FIG. 11 further illustrates a textured electrode layer 1110 including texture features 1112 that extend substantially horizontally across the textured electrode layer. Accordingly, as fluid flows through the serpentine fluid path 1104, a flow direction of the fluid will be misaligned relative to the texture features 1112, which may aid in fluidic mixing and/or bubble removal as discussed above. Moreover, without wishing to be bound by theory, the inventors have appreciated that the serpentine fluid channel, or other non-linear channel, may aid in directing bubbles and/or other debris to areas of higher curvature in the flow path, which may aid in facilitating flow through the channel 1104 and avoid clogging of the channel.

Figure 12B:
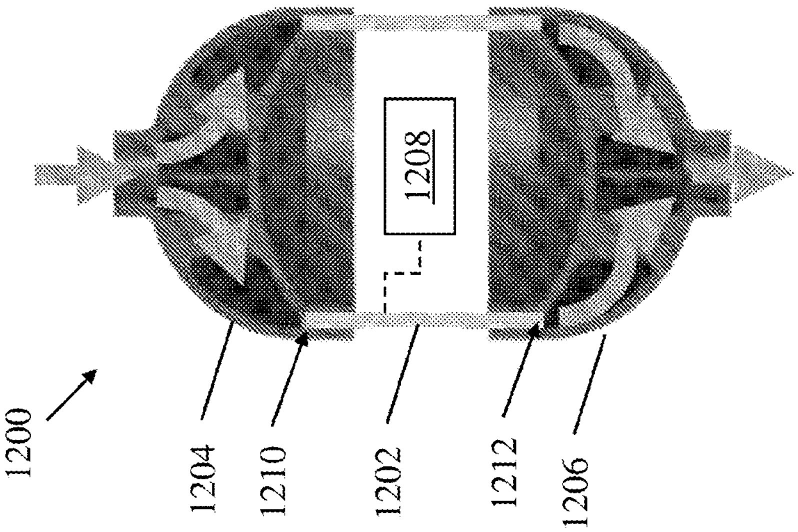
FIG. 12B is a schematic cross-sectional view of the fluid treatment device of FIG. 12A.
Figure 12A:
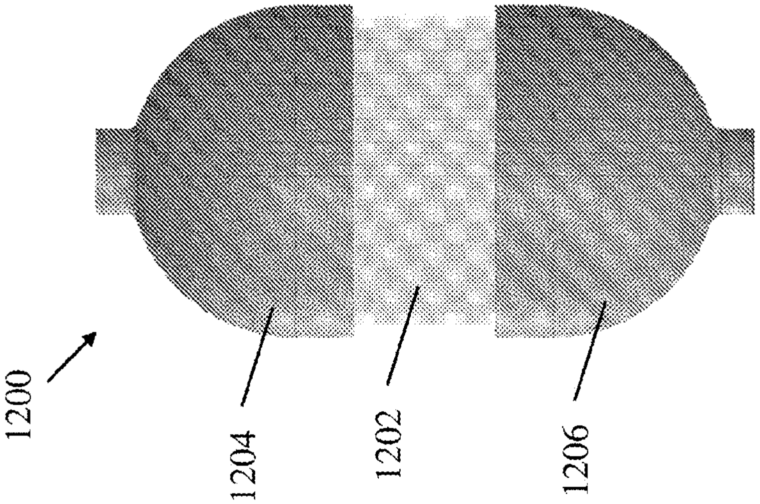
FIG. 12A depicts a fluid treatment device, according to some embodiments.

Referring now to FIGS. 12A-12B, one embodiment of a fluid treatment cartridge 1200 is described in more detail. As shown in FIG. 12A, the cartridge 1200 includes a microfluidic channel assembly 1202 that includes a plurality of microfluidic channels extending between electrode layers. The microfluidic channel assembly 1202 is positioned between an inlet cap 1204 and an outlet cap 1206. As illustrated in FIG. 12B, the inlet cap is in fluid communication with an inlet end 1210 of the microfluidic channels of the microfluidic channel assembly 1202 to direct fluid flowing into the inlet cap 1204 into the microfluidic channel assembly 1202. Similarly, the outlet cap 1204 is in fluid communication with an outlet end 1212 of the microfluidic channel assembly 1202 to direct fluid out of the cartridge after it flows through and is treated in the microfluidic channel assembly 1202. As illustrated, a power supply 1208 may be positioned within the cartridge 1200 and electrically coupled to the electrode layers of the microfluidic channel assembly 1202 to supply voltage pulses to the electrode layers and generate pulsed electric fields within the microfluidic channels to treat the fluid flowing there through.

Figure 18:
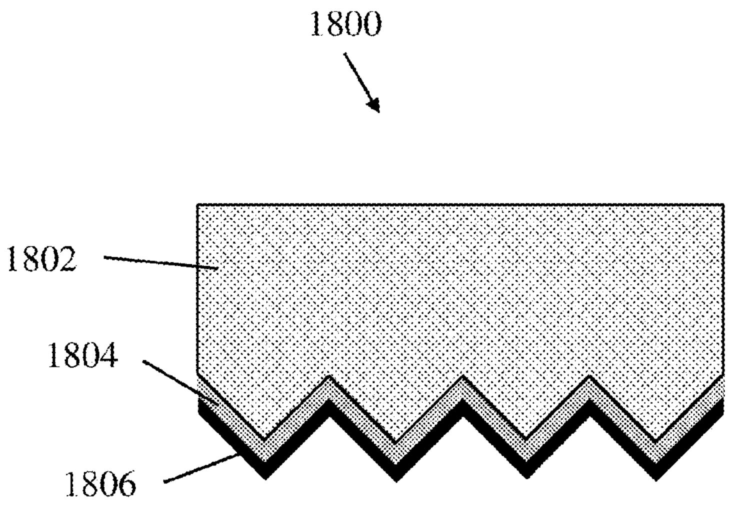
FIG. 18 is a schematic cross-sectional view of an electrode layer including a non-reactive coating, according to some embodiments.

As noted above, in some instances, the electrode layers of a microfluidic channel assembly may include a non-reactive coating layer (i.e., a chemically inert coating layer), such as an epoxy-based coating comprising graphite. In some instances, such coatings may result in reduced power consumption and/or increased operational lifespan of a fluid treatment device compared to arrangements that do not include such coating layers. For example, FIG. 18 depicts a cross-sectional view of a portion of a textured electrode layer 1800 including a base layer 1802, a conductive coating layer 1804, and a non-reactive coating layer 1806 formed over the conductive layer 1804, according to some embodiments. In some instances, a fluid treatment device including a non-reactive coating layer may have a power consumption per liter of fluid treated that is up to about eight times lower, and a device lifespan that is up to about four times longer comparted to a device that does not include the non-reactive coating layer. However, it should be understood that the fluid treatment devices disclosed herein may not include a non-reactive coating layer in some instances, as the current disclosure is not limited in this regard.

Example—Effectiveness in Turbid Fluids

In one example, the effectiveness of the devices and methods described herein was evaluated for fluid samples having varying turbidity. In particular, ISO grade fine test dust was added to MilliQ filtered water to a turbidity of 160 NTU (determined using a turbidity tube) and heat sterilized. This sample was then diluted to turbidity values of 80 NTU, 40 NTU, and 20 NTU, and each of these test samples was dosed with $10^5$ CFU/mL of k12 *E. coli*; also dosed was a 0 NTU MilliQ filtered water-only control. These samples, were treated using a fluid treatment device according to the current disclosure. Inlet, treated, and untreated samples were plated in triplicate and the resulting CFU/mL *E. coli* calculated.

Figure 13:
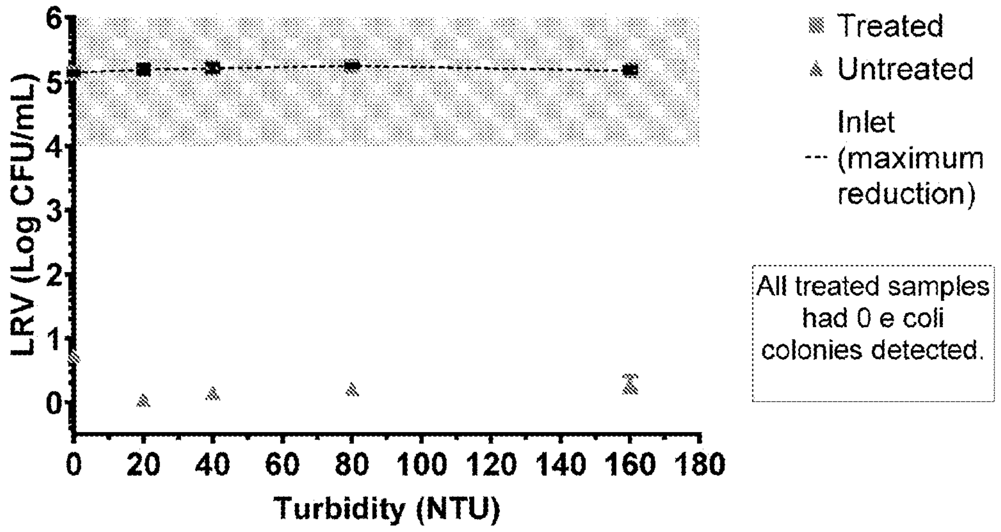
FIG. 13 is a plot of the log reduction of the measured CFU/ml value for different turbidity values, according to one example.
Figure 14:
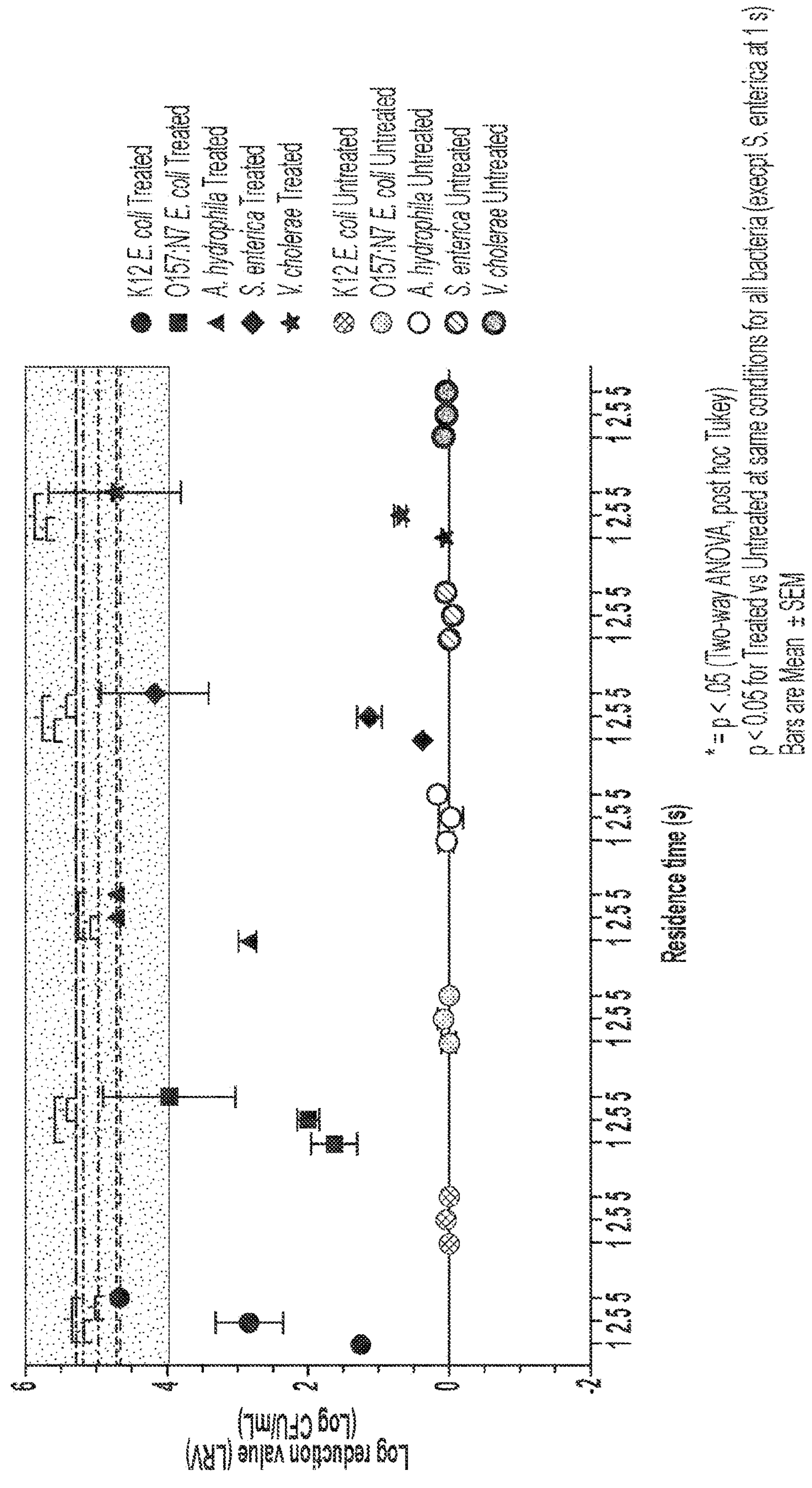
FIG. 14 is a plot of the log reduction of the measured CFU/ml value for different pathogens and varying residence times, according to one example.

As shown in FIG. 13, which depicts a plot of the log reduction of the measured CFU/ml value for different turbidity values, all treated samples had complete inactivation of the *E. coli* with no colonies detected, indicating a minimum of a 5 log reduction for this technology up to 160 NTU of turbidity. There appears to be no effect of increased turbidity on inactivation by the disclosed systems within this range of turbidity. Compared to UV treatment methods, which is generally recommended to use only at no more than 5 NTU, this example demonstrates a 32 times increase or more in the effective range of fluid turbidity. This example also demonstrates a 16 times increase in the effective range over chlorination at the WHO recommended maximum of 10 NTU for household water treatment Example—Effectiveness on Various Pathogens In another example, the effectiveness of the devices and methods described herein was evaluated for a variety of waterborne pathogens, using different flow rates. The tested pathogens included *Escherichia coli* K12 (a non-pathogenic baseline), *Escherichia coli* O157:N7 (the EHEC pathogen), *Salmonella Enterica* (the *Salmonellosis* pathogen), *Aeromonas Hydrophila* (an acute diarrheal pathogen), and *Vibrio* Cholera (the Cholera pathogen), and the test fluids were flowed through the fluid treatment devices at flow rates selected to provide a residence time in the device of 1 second, 2.5 seconds, and 5 seconds. FIG. 14 shows a plot of the log reduction value for each of the above-noted pathogens for both treated and untreated fluid samples. As shown in the plot, all pathogens were able to be inactivated to 4 LRV, with the exception that the EHEC pathogen at 3.99 LRV.

Example—Textured Electrode Configurations

Figure 15:
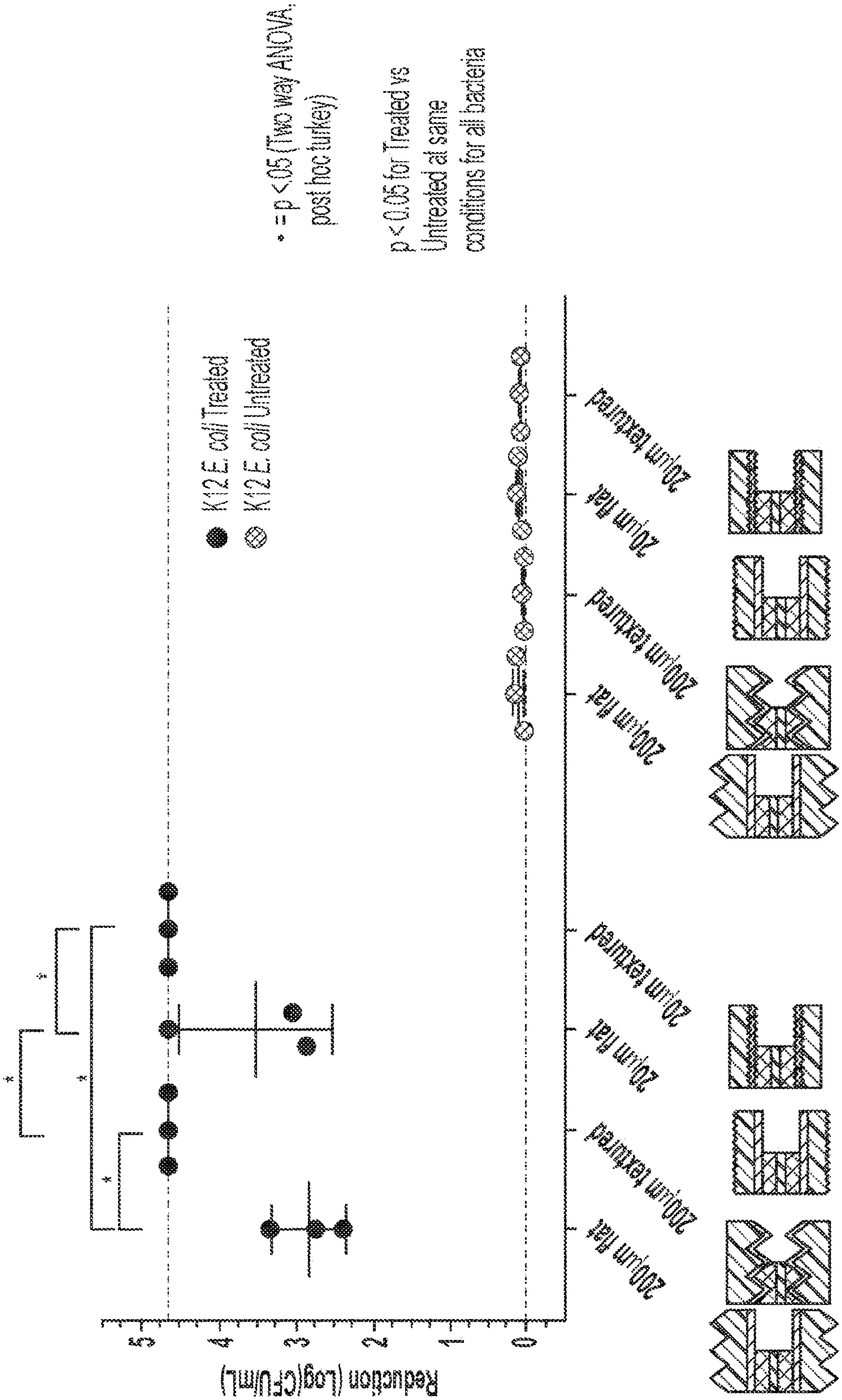
FIG. 15 is a plot of the log reduction of the measured CFU/ml value with varying electrode texture configurations, according to one example.

In one example, inactivation of K12 *E. Coli* was evaluated for fluid treatment devices including electrodes having varying texture parameters. In particular, two textured layers having texture heights of 200 microns and 20 microns, respectively, on one side of the layer, and a flat side opposing the textured side were assembled in four configurations. A 200 flat configuration used the flat sides of the 200 micron textured electrodes to form the fluid channels, a 200 textured configuration used the textured sides of the too micron electrodes to form the fluid channels. Similarly, a 20 flat configuration used the flat sides of the 20 micron textured electrodes to form the fluid channels, and a 20 textured configuration used the textured sides of the 20 micron textured electrodes to form the fluid channels. For each configuration, the electrode layers were separated by two layers of a 50 micron adhesive as well as a 25 micron spacer layer. A 100 Volt voltage was pulsed at 100 Hz and a pulse width of 100 microseconds. The flow rate through the microfluidic devices was 200 microliters per min, which resulted in a residence time of approximately 5 seconds. FIG. 15 shows a plot of the log reduction values for treated and untreated fluid samples for each of these electrode configurations.

Example—Varying Applied Voltage

Figure 16:
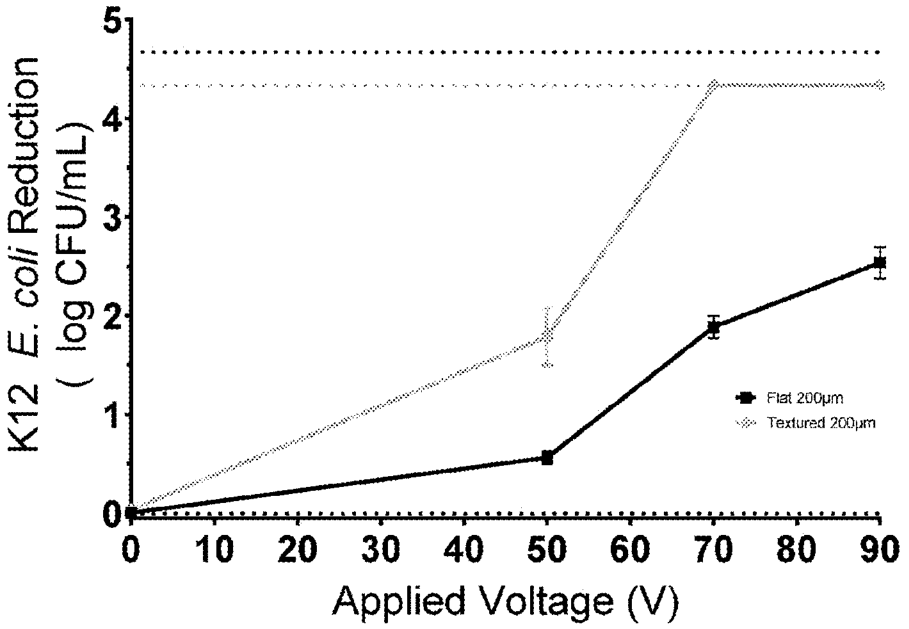
FIG. 16 is a plot of the plot of the log reduction of the measured CFU/ml value with varying applied voltage for a textured and non-textured electrode configuration, according to one example.

In one example, textured and non-textured (flat) electrode configurations were evaluated at varying applied voltages. In particular, two devices were built using textured electrodes aligned at 45 degrees and tested for *E. coli* inactivation at various input voltages between 0 and 90 Volts. The voltage was pulsed at a frequency of 100 Hz and a pulse width of 100 microseconds. The flow rate through the devices was 200 microliters per minute, resulting in a residence time of approximately 5 seconds. FIG. 16 depicts a plot of the log reduction values for the two electrode configurations. Flat electrodes did not achieve total inactivation of the *E. coli* at any voltage tested. In contrast, the textured electrodes were able to completely inactivate the *E. coli* at 70V and above. Dotted lines indicate the input amount of *E. coli* for each device.

Example—Varying Electrode Gap Distance

Figure 17:
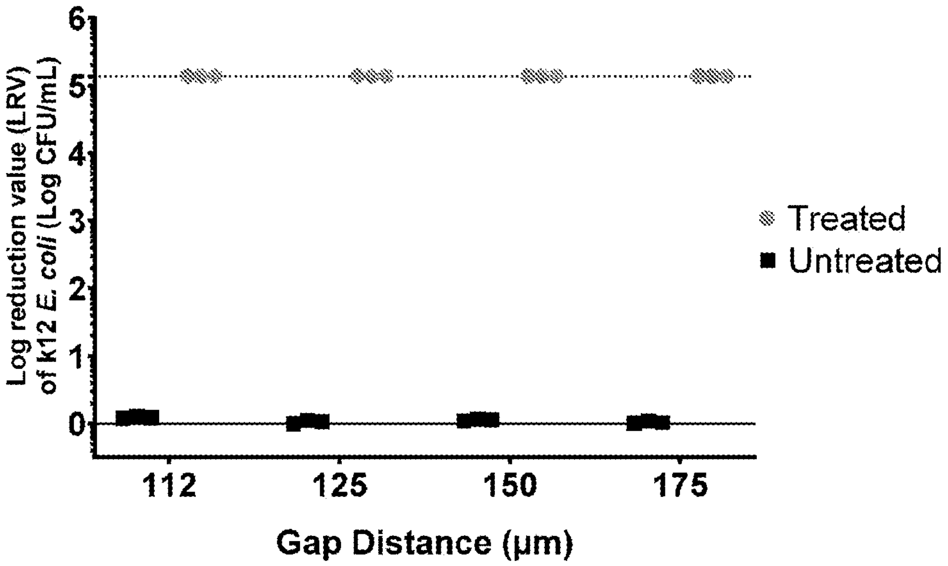
FIG. 17 is a plot of the plot of the log reduction of the measured CFU/ml value with varying electrode gap distance, according to one example.

In one example, the inactivation of K12 *E. Coli* was evaluated for fluid treatment devices including electrodes having varying gap distances (and thus microfluidic channels having varying channel heights). In this example, the electrode layers were coated with a protective graphite layer, and 25 microsecond, 120 Volt voltage pulses were applied to the electrodes. As shown in FIG. 17, which depicts a plot of the log reduction value for the different gap distances tested, the gap distance was able to be increased up to at least 175 microns, which demonstrates that the disclosed devices are able to maintain their effectiveness at larger gap distances, which may allow for increased flow rates and/or reduced power use.

Example—Electrodes Including Non-Reactive Coating

In one example, a graphite coating for an electrode layer was prepared by mixing one part Max CLR epoxy part B, two parts Max CLR epoxy part A, three parts isopropanol, and three parts 20 μm synthetic graphite flakes. The coating was deposited on gold coated PET electrodes by spin coating at 1500 RPM for 100 seconds. A fluid treatment device was constructed using the coated electrodes as previously described. The device was tested using 105 CFU/mL k12 *E. coli* in spring water at a flow rate of 200 μl/min. Fluid samples were treated by applying pulsed electric fields at a frequency of 100 Hz. The electric fields were generated by applying voltage pulses of 120V for a duration of 100 μs per pulse. Pooled samples were collected at 5 minute intervals (sample volume 1 mL) and plated to determine viability of the bacteria. No viable bacteria were detected in the effluents of the device including the graphite coating. A similar process was performed for a fluid treatment made with gold coated PET electrodes without the graphite coating layer, except that samples were collected every 3 minutes (600 μl sample volume). These gold only electrodes lost effectiveness after 27 minutes of treatment.

Figure 19:
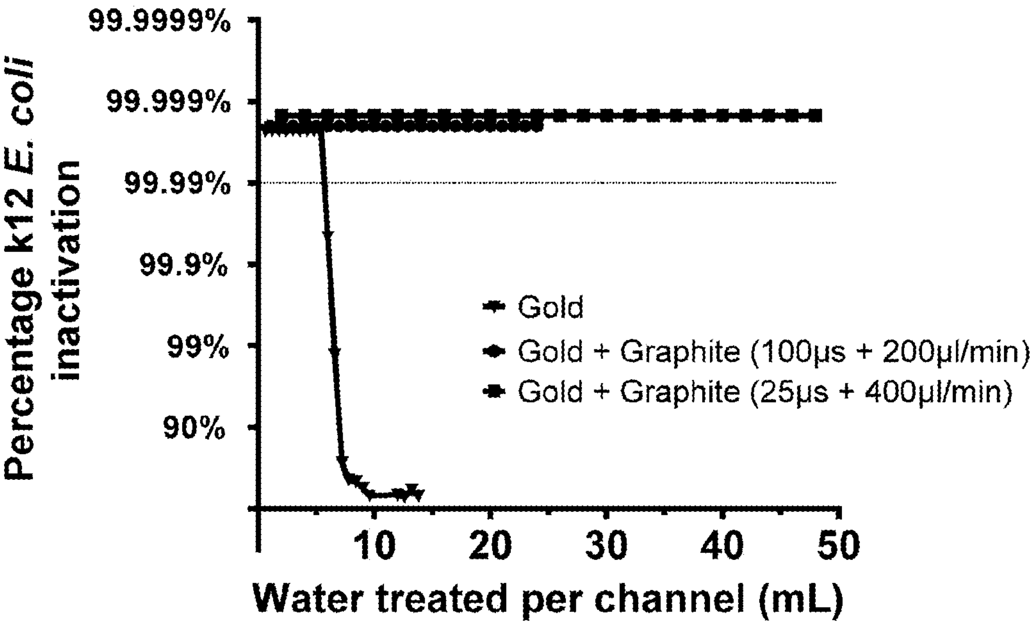
FIG. 19 is a plot of the percentage of inactivation of *E. coli* per mL of water treated per fluid channel, according to one example.

In another example using the above-described graphite coated electrodes, it was found that total inactivation of 105 CFU/mL k12 *E. coli* could be achieved using shorter pulses (25 μs) and faster flowrates (400 μl/min). The continuous run test was repeated as described above for graphite coated devices at these conditions (400 μl/min, 100 Hz, 120V, 25 μs pulses). No viable k12 *E. coli* were detected after 2 hours of running at these conditions. The results for all three tests are shown in FIG. 19, which depicts the percentage of k12 *E. coli* inactivation per mL of water treated per fluid channel.

To compare power consumption between the two electrode types (i.e., graphite coated vs. uncoated), a 1.2Ω resistor was placed in series on the ground side of fluid treatment devices comprising respective electrode arrangements. While spring water was flowing through the devices and a pulse generator on, a trace of the voltage across the devices and the resistor was measured and recorded using an oscilloscope. From the traces of the pulses, the current drawn and pulse energy was calculated. This pulse energy was then used to determine the energy required to treat a volume of water in kJ/kg, based on the flow rate of water. This was measured at 100 Hz, 120V, 100 μs pulses, and 200 μl/min for both types of electrodes and at conditions of 100 Hz, 120V, 25 μs pulses and 400 μl/min for the graphite coated electrodes. Table 1 shows the results for the power consumption for each condition. The graphite electrodes at the latter conditions are able to fully inactivate bacteria at 13% of the kJ/kg required by gold only electrodes.

TABLE 1

| | GOLD (100 μS + 200 μL/MIN) | GOLD + GRAPHITE (100 μS + 200 μL/MIN) | GOLD + GRAPHITE (25 μS + 400 μL/MIN) |
|---|---|---|---|
| PULSE ENERGY (MJ) | 10.73 | 11.0 | 2.86 |
| ENERGY/LITER (KJ/KG) | 322 | 329 | 42.9 |

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Thus, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A fluid treatment device comprising:

a first textured electrode layer comprising a first array of protrusions;

a second textured electrode layer comprising a second array of protrusions, wherein a texture of the first textured electrode layer is misaligned relative to a texture of the second textured electrode layer;

a spacer layer positioned between the first and second textured electrode layers, the spacer layer constructed and arranged to define a plurality of fluid channels extending between the first and second textured electrode layers from an inlet end at a first edge of the first and second textured electrode layers to an outlet end at a second opposing edge of the first and second textured electrode layers, wherein each channel of the plurality of fluid channels extends from the first edge to the second opposing edge, wherein the spacer layer comprises a plurality of spacing members extending between the first and second textured electrode layers, and wherein the plurality of spacing members define walls of each of the plurality of fluid channels through which fluid flows; and a power supply electrically coupled to the first and second textured electrode layers, wherein the first and second textured electrode layers are constructed and arranged to form a non-uniform electric field along a flow length of each of the plurality of fluid channels when the power supply supplies a voltage to the first and second textured electrode layers, and wherein the texture of the first textured electrode layer and the texture of the second textured electrode layer face into the plurality of fluid channels.

2. The fluid treatment device of claim 1, wherein the texture of the first textured electrode layer comprises a saw tooth texture, a ribbed texture, a pattern of raised hemispheres, a pattern of raised rectangles, a pattern of raised cylinders, a pattern of raised cones, and/or a pattern of raised pyramids.

3. The fluid treatment device of claim 1, wherein the texture of the first textured electrode layer is misaligned relative to a flow direction of the plurality of fluid channels.

4. The fluid treatment device of claim 1, wherein the texture of the second textured electrode layer comprises a saw tooth texture, a ribbed texture, a pattern of raised hemispheres, a pattern of raised rectangles, a pattern of raised cylinders, a pattern of raised cones, and/or a pattern of raised pyramids.

5. The fluid treatment device of claim 1, wherein the texture of the first textured electrode layer is misaligned relative to the texture of the second textured electrode layer by about 45 degrees.

6. The fluid treatment device of claim 1, wherein each of the first and second textured electrode layers comprises a textured polymer layer coated with a conductive layer.

7. The fluid treatment device of claim 6, wherein the conductive layer comprises at least one selected from the group consisting of a gold layer, a platinum layer, a titanium layer, a stainless steel layer, a carbon nanotube composite layer, and an epoxy-graphite composite layer.

8. The fluid treatment device of claim 1, wherein a distance between the first and second textured electrode layers is between about 10 microns and about 2 mm.

9. The fluid treatment device of claim 8, wherein the distance between the first and second textured electrode layers is between about 10 microns and 100 microns.

10. The fluid treatment device of claim 1, wherein a width of each fluid channel is between about 100 microns and 5 cm.

11. The fluid treatment device of claim 1, wherein a characteristic texture height of the first textured electrode layer and/or the second textured electrode layer is between about 20 microns and about 200 microns.

12. The fluid treatment device of claim 1, wherein the power supply is configured to supply voltage pulses to the first and second textured electrode layers, and wherein a voltage change for each voltage pulse is between about 50 Volts and about 200 Volts.

13. The fluid treatment device of claim 12, wherein the voltage is pulsed in a square wave pattern.

14. The fluid treatment device of claim 1, wherein the power supply is configured to supply bi-directional voltage pulses to the first and second textured electrode layers between about 120 Volts and about-120 Volts.

15. The fluid treatment device of claim 1, wherein the spacer layer is constructed and arranged to define between about 50 fluid channels and about 1000 fluid channels of the plurality of fluid channels.

16. The fluid treatment device of claim 15, wherein the fluid channels are configured to provide a flow rate of up to 0.2 L/min.

17. The fluid treatment device of claim 1, further comprising a non-reactive coating layer formed on the first textured electrode layer and/or the second textured electrode layer.

18. The fluid treatment device of claim 17, wherein the non-reactive coating layer comprises graphite.

19. The fluid treatment device of claim 1, wherein a height of the plurality of fluid channels is a minimum spacing between the texture of the first textured electrode layer and the texture of the second textured electrode layer.

20. The fluid treatment device of claim 1, wherein the first textured electrode layer and the second textured electrode layer are disposed against the spacer layer.

21. A method for treating a fluid, the method comprising:

flowing the fluid through a plurality of fluid channels of a fluid treatment device, the plurality of fluid channels extending between a first textured electrode layer comprising a first array of protrusions and a second textured electrode layer comprising a second array of protrusions, wherein a texture of the first textured electrode layer is misaligned relative to a texture of the second textured electrode layer, wherein a spacer layer is positioned between the first and second textured electrode layers, the spacer layer constructed and arranged to define the plurality of fluid channels extending between the first and second textured electrode layers from an inlet end at a first edge of the first and second textured electrode layers to an outlet end at a second opposing edge of the first and second textured electrode layers, wherein each channel of the plurality of fluid channels extends from the first edge to the second opposing edge, wherein the spacer layer comprises a plurality of spacing members extending between the first and second textured electrode layers, and wherein the plurality of spacing members define walls of each of the plurality of fluid channels through which fluid flows;

supplying a voltage to the first and second textured electrode layers via a power supply electrically coupled to the first and second electrode layers; and applying a non-uniform electric field to the fluid along a flow length of the plurality of fluid channels using the first textured electrode layer and the second textured electrode layer, wherein the texture of the first textured electrode layer and the texture of the second textured electrode layer face into the plurality of fluid channels.

22. The method of claim 21, wherein the texture of the first textured electrode layer comprises a saw tooth texture, a ribbed texture, a pattern of raised hemispheres, a pattern of raised rectangles, a pattern of raised cylinders, a pattern of raised cones, and/or a pattern of raised pyramids.

23. The method of claim 21, wherein the texture of the first textured electrode layer is misaligned relative to a flow direction of the plurality of fluid channels.

24. The method of claim 21, wherein the first and/or second textured electrode layer comprises a non-reactive coating layer.

* * * * *